(12) United States Patent
Fujiwara et al.

(10) Patent No.: US 7,482,724 B2
(45) Date of Patent: Jan. 27, 2009

(54) IPM ELECTRIC ROTATING MACHINE

(75) Inventors: Kenji Fujiwara, Hyogo (JP); Takatoshi Kogure, Hyogo (JP); Akira Nishio, Hyogo (JP); Tutomu Baba, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 31 days.

(21) Appl. No.: 10/588,516

(22) PCT Filed: Feb. 3, 2005

(86) PCT No.: PCT/JP2005/001597

§ 371 (c)(1),
(2), (4) Date: Jun. 18, 2007

(87) PCT Pub. No.: WO2005/076440

PCT Pub. Date: Aug. 18, 2005

(65) Prior Publication Data

US 2007/0278886 A1     Dec. 6, 2007

(30) Foreign Application Priority Data

Feb. 5, 2004  (JP) .............................. 2004-029016

(51) Int. Cl.
  *H02K 21/14*  (2006.01)
  *H02K 21/16*  (2006.01)
  *H02K 1/14*   (2006.01)
(52) U.S. Cl. .............................. 310/156.45; 310/156.53
(58) Field of Classification Search ............ 310/156.43, 310/156.45, 156.48, 156.53, 156.56
See application file for complete search history.

(56) References Cited

U.S. PATENT DOCUMENTS

| | | | |
|---|---|---|---|
| 4,358,696 A | 11/1982 | Liu et al. | |
| 4,924,130 A | 5/1990 | Fratta | |
| 5,097,166 A | 3/1992 | Mikulic | |
| 5,510,662 A | 4/1996 | Tanimoto et al. | |
| 5,672,926 A | 9/1997 | Brandes et al. | |
| 5,811,904 A | 9/1998 | Tajima et al. | |
| 6,034,458 A | 3/2000 | Uetake et al. | |
| 6,034,459 A | 3/2000 | Matsunobu et al. | |
| 6,049,153 A * | 4/2000 | Nishiyama et al. | 310/156.53 |
| 6,239,525 B1 | 5/2001 | Matsunobu et al. | |

(Continued)

FOREIGN PATENT DOCUMENTS

JP         51-127410         11/1976

(Continued)

*Primary Examiner*—Burton Mullins
(74) *Attorney, Agent, or Firm*—Kanesaka Berner & Partners, LLP

(57) ABSTRACT

The present invention provides a technique for enabling permanent magnets constituting the field magnet system of an IPM electric rotating machine to be embedded in a rotor core in a shallower depth. The IPM electric rotating machine is composed of a stator and a rotor. The rotor includes a rotor core and permanent magnets constituting the field magnet system. The rotor core has a side face opposed to the stator, and the permanent magnets are shallowly embedded so that the distance between the pole face thereof and the rotor side face is reduced. Furthermore, two adjacent permanent magnets are intensively spaced so that the following formula holds:

$$0.3 < (L_q - L_d)/L_d,$$

where $L_q$ is the q-axis inductance of the rotor, and $L_d$ is the d-axis inductance thereof.

3 Claims, 3 Drawing Sheets

U.S. PATENT DOCUMENTS

| | | |
|---|---|---|
| 6,853,106 B2 | 2/2005 | Fujiwara et al. |
| 6,867,526 B2 * | 3/2005 | Mori et al. ............. 310/156.57 |
| 2002/0171311 A1 * | 11/2002 | Fujiwara et al. ............. 310/184 |

FOREIGN PATENT DOCUMENTS

| | | |
|---|---|---|
| JP | 52-106414 | 9/1977 |
| JP | 54-077909 | 6/1979 |
| JP | 03-037000 | 2/1991 |
| JP | 04-322105 | 11/1992 |
| JP | 05-076146 | 3/1993 |
| JP | 05-236687 | 9/1993 |
| JP | 05-304743 | 11/1993 |
| JP | 06-156064 | 6/1994 |
| JP | 08-182105 | 7/1996 |
| JP | 08-331823 | 12/1996 |
| JP | 08-331883 | 12/1996 |
| JP | 09-191683 | 7/1997 |
| JP | 09-201065 | 7/1997 |
| JP | 09-28508 | 10/1997 |
| JP | 10-023724 | 1/1998 |
| JP | 10-126985 | 5/1998 |
| JP | 10-262359 | 9/1998 |
| JP | 10-313505 | 11/1998 |
| JP | 11-004553 | 1/1999 |
| JP | 11-027879 | 1/1999 |
| JP | 11-089133 | 3/1999 |
| JP | 11-089134 | 3/1999 |
| JP | 11-089135 | 3/1999 |
| JP | 11-089136 | 3/1999 |
| JP | 11-089137 | 3/1999 |
| JP | 11-089145 | 3/1999 |
| JP | 11-098791 | 4/1999 |
| JP | 11-136892 | 5/1999 |
| JP | 11-196544 | 7/1999 |
| JP | 11-206049 | 7/1999 |
| JP | 11-243653 | 9/1999 |
| JP | 11-275784 | 10/1999 |
| JP | 11-285185 | 10/1999 |
| JP | 11-285186 | 10/1999 |
| JP | 11-346497 | 12/1999 |
| JP | 2000-069784 | 3/2000 |
| JP | 2000-069788 | 3/2000 |
| JP | 2000-078784 | 3/2000 |
| JP | 2000-125489 | 4/2000 |
| JP | 2000-125490 | 4/2000 |
| JP | 2000-134978 | 5/2000 |
| JP | 2000-152569 | 5/2000 |
| JP | 2000-152682 | 5/2000 |
| JP | 2000-152684 | 5/2000 |
| JP | 2000-175389 | 6/2000 |
| JP | 2000-197386 | 7/2000 |
| JP | 2000-217286 | 8/2000 |
| JP | 2000-228890 A | 8/2000 |
| JP | 2001-145395 | 5/2001 |
| JP | 2002-153033 A | 5/2002 |
| JP | 2003-199273 A | 7/2003 |
| JP | 2003-284274 A | 10/2003 |
| RU | 2022824 | 11/1994 |
| RU | 94021358 | 8/1996 |

* cited by examiner

IPM ELECTRIC ROTATING MACHINE

TECHNICAL FIELD

The present invention is related to IPM (Interior Permanent Magnet) electric rotating machines, such as IPM motors and IPM generators.

BACKGROUND ART

The IPM motor is a brushless motor having permanent magnets embedded in a rotor core. The IPM motor is advantageous in large output torque per volume, and reduced input voltage. These advantages make it preferable to apply the IPM motor to drive motors of electric vehicles.

An IPM motor also functions as a generator, when externally fed with motive energy. The fact that an IPM motor also functions as a generator is especially important for application to electric vehicles. Hereinafter, IPM motors and IPM generators are collectively referred to as IPM electric rotating machines, when it is unnecessary to distinguish IPM motors and IPM generators.

The IPM electric rotating machine is desired to generate a large output torque. An IPM motor structure for generating a large output torque is disclosed in Japanese Laid Open Patent Application No. Jp 2002-153033A. In the disclosed IPM motor, permanent magnets of the field magnet system are shallowly embedded in a rotor core. Such structure enables generating an increased magnet torque and an auxiliary reluctance torque, and thereby effectively increases the output torque of the IPM motor. The above-mentioned document discloses that the increase in the flux density of the flux applied to armature coils is preferable for increasing the magnet torque. Additionally, the above-mentioned document discloses that it is preferable that the permanent magnets are shallowly embedded in the rotor core, and thereby the q-axis inductance and the d-axis inductance satisfy the following relation:

$$0 \leq (L_q - L_d)/L_d < 0.3.$$

DISCLOSURE OF INVENTION

An object of the present invention is to provide a rotor structure of an IPM electric rotating machine for achieving further increased output torque.

In an aspect of the present invention, an IPM electric rotating machine is composed of a stator, and a rotor including a rotor core and a plurality of permanent magnets functioning as a field magnet system. The rotor has a side face opposed to the stator, and the permanent magnets each have a pole face opposed to the side face. The permanent magnets are embedded so that a maximum value of a distance from the pole face to the side face satisfies the following formulas (1a) and (1b) which are represented by a radius r of the rotor, and a number of poles of the field magnet system:

$$x \leq D/10, \text{ and} \tag{1a}$$

$$D = 2\pi r/n_1, \text{ and} \tag{1b}$$

Additionally, adjacent two of the permanent magnets, which function as adjacent two poles of the field magnet system are spaced apart so that the following formula (2) is satisfied, which is described using a q-axis inductance $L_q$, and d-axis inductance $L_d$:

$$0.3 < (L_q - L_d)/L_d. \tag{2}$$

In the IPM electric rotating machine thus designed, the magnet torque is large due to the fact that the permanent magnets are shallowly embedded. Additionally, the volume of inter-magnet core portions of the rotor core positioned between adjacent two of the permanent magnets is large in IPM electric rotating machine, which increases the reluctance torque exerted on the inter-magnet core portions. These effects allow the IPM electric rotating machine to increase the output torque, which is the sum of the magnet torque and the reluctance torque.

When the stator is fed with a three-phase current, it is preferable that the number of poles $n_1$ of the field magnet system and a number of slots $n_2$ provided for the stator are any one of the following combinations:

$n_1=12, n_2=9,$
$n_1=14, n_2=12,$
$n_1=16, n_2=12,$
$n_1=16, n_2=18,$
$n_1=20, n_2=15,$
$n_1=20, n_2=18,$
$n_1=20, n_2=21,$
$n_1=22, n_2=24,$
$n_1=24, n_2=18,$
$n_1=24, n_2=27,$
$n_1=26, n_2=24,$
$n_1=28, n_2=24,$ and
$n_1=30, n_2=27.$ These combinations remarkably improve the characteristics of the IPM electric rotating machine in which the permanent magnets are shallowly embedded.

When the stator is fed with a five-phase current, the number of poles $n_1$ of the field magnet system and a number of slots $n_2$ provided for the stator are any one of the following combinations:

$n_1=12, n_2=10,$
$n_1=14, n_2=10,$
$n_1=22, n_2=20,$
$n_1=18, n_2=20,$
$n_1=24, n_2=20,$
$n_1=26, n_2=20,$
$n_1=28, n_2=20,$
$n_1=26, n_2=30,$ and
$n_1=28, n_2=30.$ These combinations remarkably improve the characteristics of the IPM electric rotating machine in which the permanent magnets are shallowly embedded.

The present invention provides a rotor structure of an IPM electric rotating machine for achieving further increased output torque.

BEST MODE FOR CARRYING OUT THE INVENTION

Embodiments of the IPM electric rotating machine in accordance with the present invention will be described below with reference to the attached drawings.

First Embodiment

Figure 1:
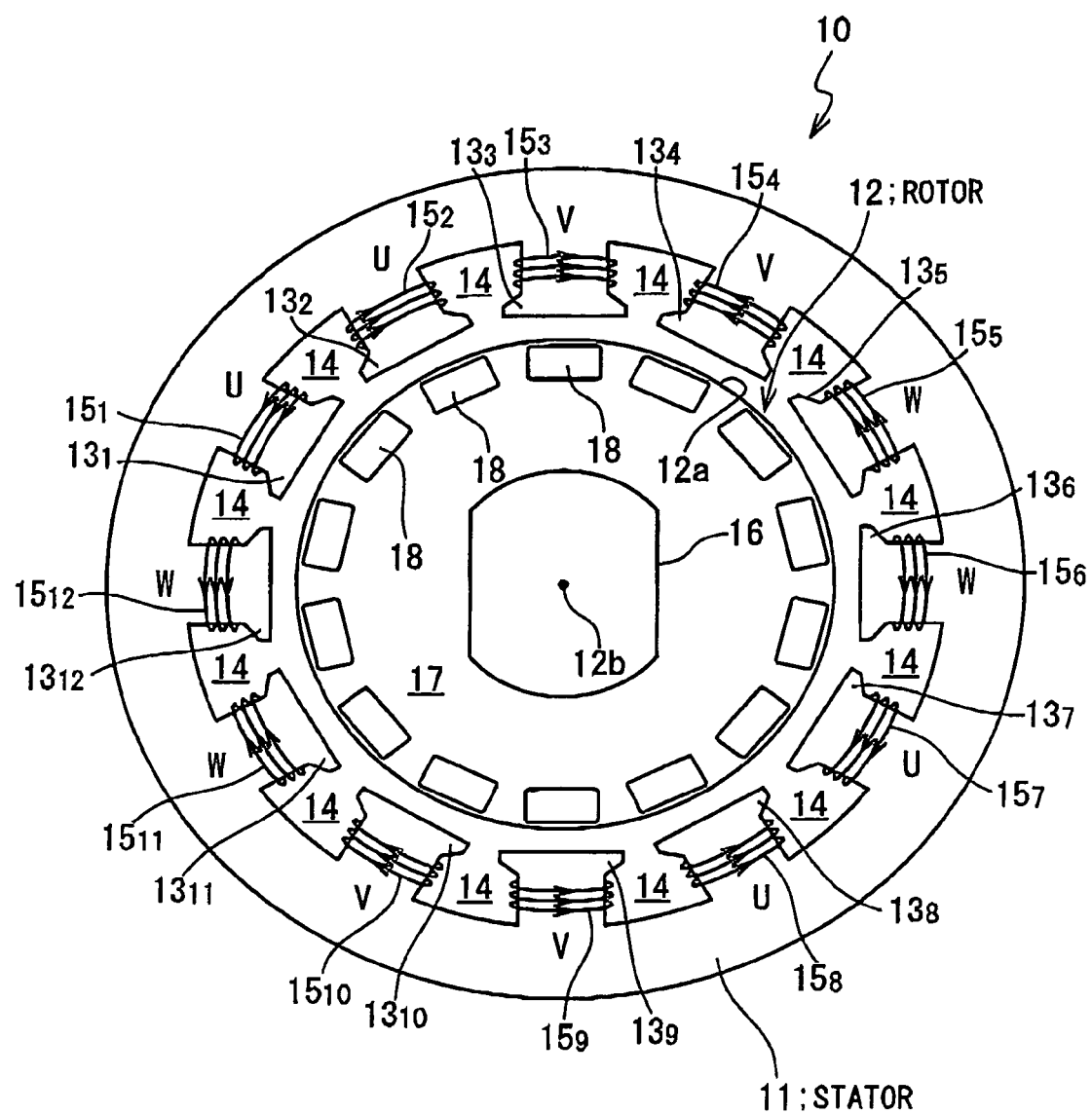
FIG. 1 illustrates a first embodiment of an IPM electric rotating machine in accordance with the present invention.

In a first embodiment of the present invention, as shown in FIG. 1, an IPM motor 10 is composed of a stator 11 and a rotor 12. The stator 11 is opposed to the rotor side face 12a of the rotor 12. The stator 11 applies a torque to the rotor 12 through the electromagnetic effect, and thereby rotates the rotor 12 around the center axis 12b. The IPM motor 10 also functions as a generator, when externally fed with motive power.

The torque applied to the rotor 12, that is, the output torque from the IPM motor 10 includes components of both of the magnet torque and the reluctance torque. The IPM motor 10 is designed to enhance the sum of the magnet torque and the reluctance torque (that is, the output torque) through optimization of the structure of the rotor 12. Descriptions are given of the structures of the stator 11 and the rotor 12 in the following.

The stator 11 is composed of armature teeth $13_1$ to $13_{12}$. In the following, the armature teeth $13_1$ to $13_{12}$ may be referred to as armature teeth 13, when it is unnecessary to distinguish the armature teeth $13_1$ to $13_{12}$ one another. The armature teeth 13 are circumferenced and spaced at constant intervals. A slot 14 is formed between every adjacent two armature teeth 13. This implies that the slots 14 are circumferenced and spaced at constant intervals.

Armature coils $15_1$ to $15_2$ are wounded around the armature teeth $13_1$ to $13_{12}$, respectively. A three-phase armature current is fed to the armature coils $15_1$ to $15_{12}$ to generate a rotating magnetic field within the stator 11. In detail, A U-phase current is fed to the armature coils $15_1$, $15_2$, $15_7$, and $15_8$, a V-phase current is fed to the armature coils $15_3$, $15_4$, $15_9$, and $15_{10}$, and a W-phase current is fed to the armature coils $15_5$, $15_6$, $15_{11}$, and $15_{12}$. The armature coils $15_1$, $15_4$, $15_5$, $15_8$, $15_9$, and $15_{12}$ are wounded in a first direction (for example, clockwise), while the armature coils $15_2$, $15_3$, $15_6$, $15_7$, $15_{10}$, and $15_{11}$ are wounded in a second direction opposite to the first direction (for example, counterclockwise). The armature coils $15_1$ to $15_{12}$ may be referred to as armature coils 15, when it is unnecessary to distinguish the armature coils $15_1$ to $15_{12}$, one another.

The armature coils 15 are wounded around the armature teeth 13 with concentrated winding. Winding the armature coils 15 with concentrated winding preferably increases the torque of the IPM motor 10 per volume.

The rotor 12 is composed of a shaft 16 and a rotor core 17. The shaft 16 is rotatably supported by roller bearings (not shown). The rotor core 17 is rigidly fixed to the shaft 16, rotating with the shaft 16. The rotor core 17 is formed of magnetic material, such as silicon steel.

Permanent magnets 18 are inserted into the rotor core 17. Each of the permanent magnets 18 functions as a pole of the field magnet system of the rotor 12, generating magnetic flux in the radial direction of the rotor 12. Adjacent two permanent magnets 18 generates magnetic flux in the opposite directions; that is, the polarities of adjacent two permanent magnets 18 are opposite. In this embodiment, the number of the permanent magnets 18, that is, the number of pole $n_1$ is 14.

Figure 2:
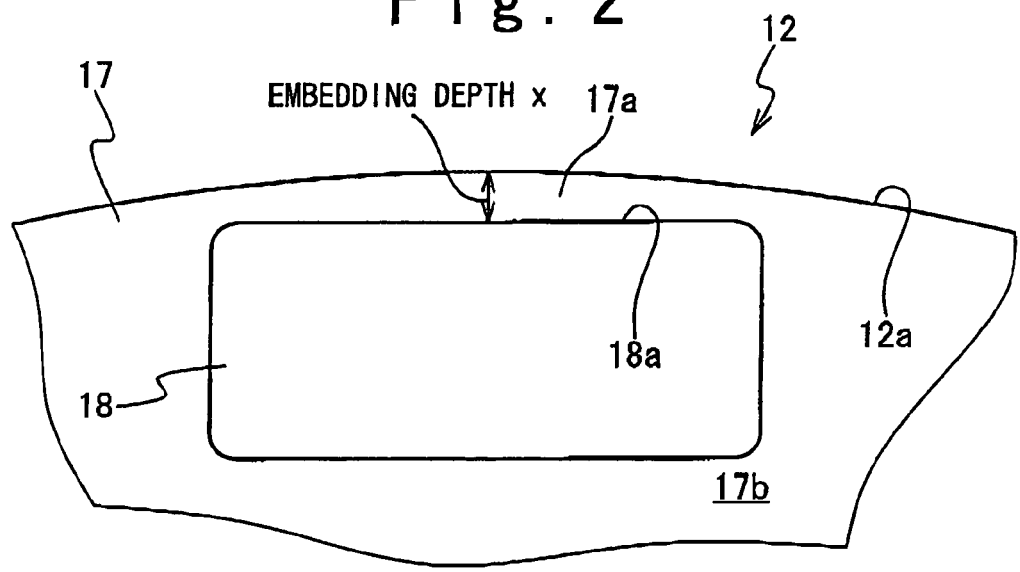
FIG. 2 is an enlarged view of a rotor 12.

As shown in FIG. 2, the rotor core 17 includes portions 17a positioned outside the permanent magnets 18 in the radial direction (flux inducing portions 17a). The flux inducing portions 17a are connected with the main core body 17b on the ends positioned in the circumferential direction. The existence of the flux inducing portions 17a is important for achieving weak field control. As is well known in the art, the weak field control, which advances the phase of the armature current, is implemented when an IPM motor is operated at a high revolution speed. The flux inducing portions 17a facilitates the implementation of the weak field control. It is hard to implement the weak field control for an SPM (Surface Permanent Magnet) motor, which does not include flux inducing portions 17a.

Differently from typical IPM motors, the IPM motor in this embodiment is shallow in the embedding depth of the permanent magnets 18 from the rotor side face 12a, (that is, the maximum value of the distance from the pole faces 18a positioned outward in the radial direction to the rotor side face 12a). Quantitatively, the permanent magnets 18 are embedded at positions at which the embedding depth x satisfies the following formulas (1a) and (1b) which are represented by the radius r of the rotor 12, and the number of the poles $n_1$:

$$x \leq D/10, \text{ and} \tag{1a}$$

$$D = 2\pi r/n_1. \tag{1b}$$

The shallowly embedded permanent magnets 18 are effective for making use of the magnet torque of the IPM motor 10, as well as achieving the weak field control. The shallowly embedded permanent magnets 18 allow much of the flux generated by the permanent magnets 18 to be applied to the armature coils 15, and thereby enhances the magnet torque. The use of the magnet torque is effective for increasing the output torque.

Figure 3:
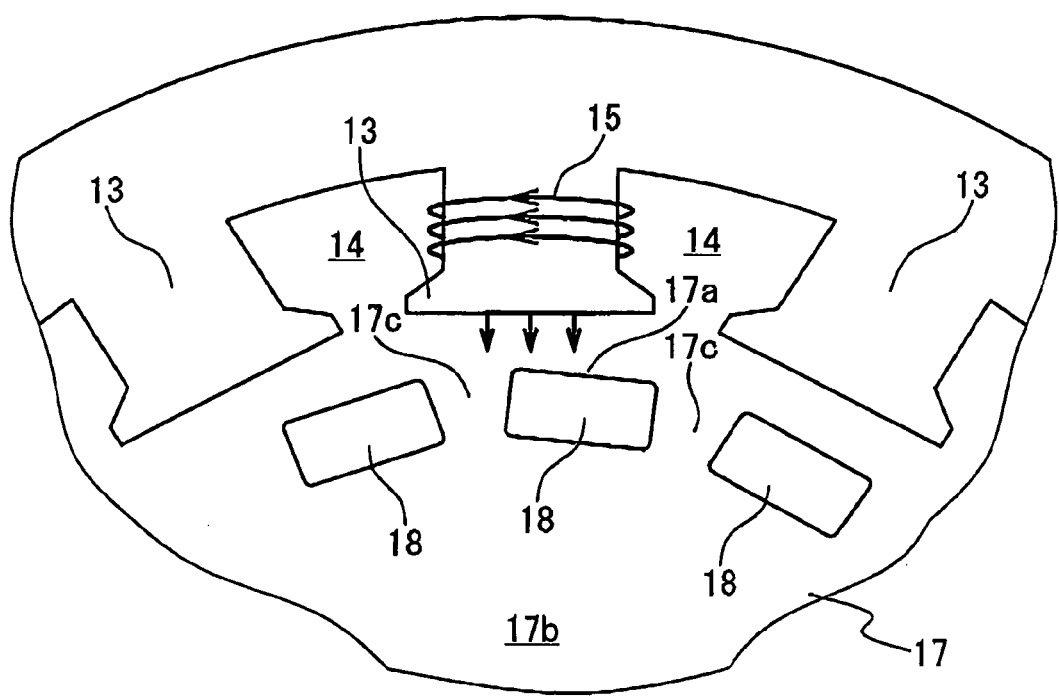
FIG. 3 is a view illustrating an arrangement of permanent magnets 18.

Additionally, as shown in FIG. 3, the IPM motor in this embodiment achieves an increase in the output torque through making effective use of the reluctance torque exerted on inter-magnet core portions 17c of the rotor core 17, which are positioned between adjacent permanent magnets 18.

Specifically, in order to increase the reluctance torque exerted on inter-magnet core portions 17c, the width of the pole faces 18a of the permanent magnets 18 is reduced in the circumferential direction to intentionally increase the distance between the adjacent permanent magnets 18. Such arrangement of the permanent magnets 18 increases the volume of the inter-magnet core portions 17c, and thereby increases the reluctance torque exerted on inter-magnet core portions 17c.

Qualitatively, adjacent two of the permanent magnets 18 are spaced apart so that the following formula (2) holds:

$$0.3 < (L_q - L_d)/L_d, \tag{2}$$

where $L_q$ is the q-axis inductance of the rotor 12, and the $L_d$ is the d-axis inductance thereof.

The technique presented in this embodiment, which makes use of the reluctance torque exerted on the inter-magnet core portions 17c, is based on a technical idea completely different from the technique disclosed in the document mentioned in the description of the Background Art. The above-described document discloses that it is preferable for the increase in the magnet torque to enhance the flux density of the flux applied to the armature coils. The IPM motor in this embodiment, on the contrary, the width of the pole faces 18a of the permanent magnets 18 is intentionally reduced in the circumferential direction, and thereby the flux applied to the armature coil 15 is reduced. This results in that the reduction of the magnet torque; however, the IPM motor in this embodiment achieves the increase in the reluctance torque exerted on the inter-magnet core portions 17c due to the increase in the distance between adjacent two of the permanent magnets 18, and thereby increases the output torque as a whole.

The shallowly embedded permanent magnets 18 are effective for the structure in which the distance between two permanent magnets 18 is increased to make effective use of the reluctance torque. The reluctance torque of the IPM motor 10 in this embodiment is represented by the following formula (3):

$$T_R = K(L_q - L_d) I_q \cdot I_d, \quad (3)$$

where K is a constant, and $I_q$ and $I_d$ are the q-axis and d-axis current through the armature coils 15, respectively. The increase in the distance between adjacent permanent magnets 18 causes an increase in the q-axis inductance $L_q$, and therefore enhances the output torque as is understood from the formula (3). Additionally, the shallowly embedded permanent magnets 18 cause a decrease in the d-axis inductance $L_d$. As is understood from the formula (3), the decrease in the d-axis inductance $L_d$ increases the reluctance torque $T_R$. Furthermore, the decrease in the d-axis inductance $L_d$ causes an increase in the d-axis current $I_d$, and therefore enhances the reluctance torque $T_R$ as is understood from the formula (3).

As explained above, in this embodiment, the permanent magnets 18 are shallowly embedded, and the distance between adjacent permanent magnets 18 are increased. This achieves the increase in the reluctance torque exerted on the inter-magnet core portions 17, and thereby increases the output torque of the IPM motor 10. Additionally, the shallowly embedded permanent magnets 18 cause the decrease in the d-axis inductance $L_d$, and thereby further increases the reluctance torque exerted on the inter-magnet portions 17.

As thus described, the IPM motor 10 in this embodiment makes effective use of both of the magnet torque and the reluctance torque exerted on the inter-magnet core portions 17c, differently from typical IPM motors. This results from the shallowly embedded permanent magnets 18 and the intentionally increased distance between adjacent permanent magnets 18.

In order to make effective use for the specialty of the IPM motor 10 thus designed, it is preferable that the number of poles of the rotor 12 (denoted by $n_1$), and the number of slots 14, denoted by $n_2$ (that is, the number of the armature teeth 13) are any one of the following combinations:

$n_1=12, n_2=9$,
$n_1=14, n_2=12$,
$n_1=16, n_2=12$,
$n_1=16, n_2=18$,
$n_1=20, n_2=15$,
$n_1=20, n_2=18$,
$n_1=20, n_2=21$,
$n_1=22, n_2=24$,
$n_1=24, n_2=18$,
$n_1=24, n_2=27$,
$n_1=26, n_2=24$,
$n_1=28, n_2=24$, and
$n_1=30, n_2=27$.

As is well known in the art, the three-phase IPM motor requires that the number of poles $n_1$ is an even number, and the number of slots $n_2$ is a multiple of 3, while the number of poles $n_1$ and the number of slots $n_2$ are different. Various combinations satisfying these requirements may be allowed for the number of poles $n_1$ and the number of slots $n_2$; however, the above-described combinations are especially advantageous for the IPM motor 10, which is composed of the shallowly embedded permanent magnets 18. The reason is as follows:

Firstly, all these combinations require that the number of poles $n_1$ is relatively large. As described in the above-mentioned document, the increase in the number of poles $n_1$ increases the armature-coil-applied component of the flux generated by the field magnet system, and thereby increases the magnet torque, which is the main component of the output torque of the IPM motor 10.

Secondly, these combinations allow each permanent magnet 18, which functions as each pole of the field magnet system, to be opposed in the front of one of the armature teeth 13. Specifically, the above-described combinations reduce the difference between the number of poles $n_1$ and the number of slots $n_2$ down to five or less. This effectively increases the magnet torque, which is the main component of the output torque of the IPM motor 10. The reduced difference between the number of poles $n_1$ and the number of slots $n_2$ is also effective for increasing the winding factor. The increased winding factor allows more of the flux generated by the permanent magnets 18 to be applied to the armature coils 15, and thereby increases the magnet torque. Quantitatively, all of the above-described combinations achieve an increase in the winding factor up to 0.94 or more.

Thirdly, these combinations increase the winding factor for the fundamental harmonic component of the stator magneto motive force, and allow design for the reduction of the winding factor for the higher harmonic component. Therefore, these combinations especially increase the output of the IPM motor 10.

The above-described combinations, which enjoy all of these advantages, are advantageous for the IPM motor 10, in which the embedding depth of the permanent magnets 18 is shallow.

Second Embodiment

Figure 4:
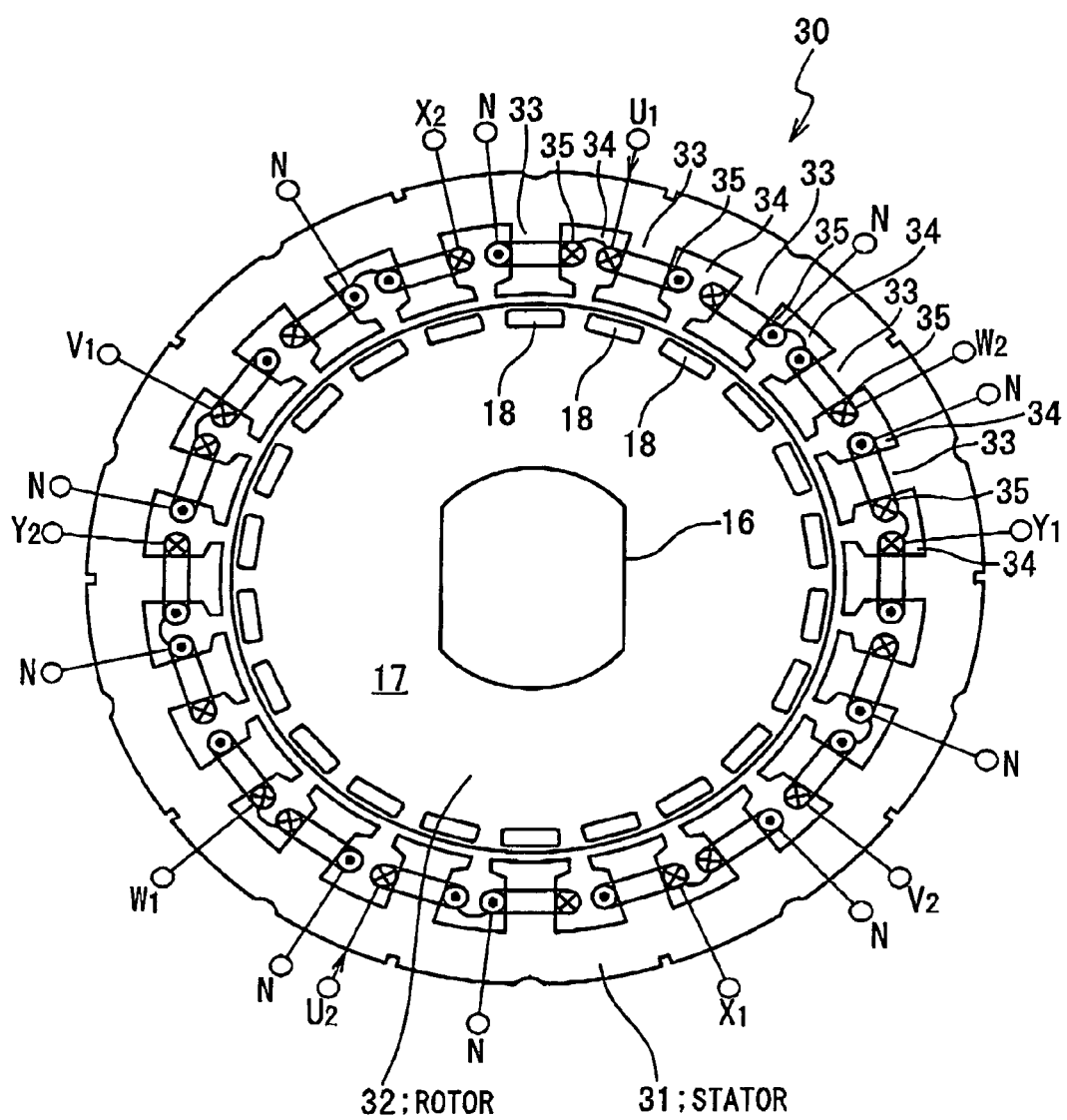
FIG. 4 illustrates a second embodiment of an IPM electric rotating machine in accordance with the present invention.

In a second embodiment, the present invention is applied to a five-phase IPM motor 30, as shown in FIG. 4. The use of the five-phase IPM motor is preferable compared to the three-phase IPM motor, because the five-phase IPM motor 30 allows reducing the capacity of the inverter and the capacitance of the capacitor necessary for the drive thereof. The IPM motor 30 is composed of a stator 31, and a rotor 32.

The stator 31 is composed of armature teeth 33. The armature teeth 33 are circumferenced and spaced at constant intervals. A slot 34 is formed between every two adjacent armature teeth 33. This implies that the slots 34 are circumferenced and spaced at constant intervals. In this embodiment, the number of the slots 34, denoted by $n_2$, is 20. Armature coils 35 are wounded around the respective armature teeth 33. The armature coils 35 are fed with a five-phase armature current to generate a rotating magnetic field inside the stator 11.

The structure of the rotor 32 is identical to the rotor 12 in the first embodiment, except for the number of the permanent magnets 18. In this embodiment, the number of the permanent magnets 18 (that is, the number of poles of the field magnet system) is 22. The permanent magnets 18 are embedded at shallow positions at which the embedding depth x satisfies the following formulas (1a) and (1b):

$$x \leq D/10, \quad (1a)$$

$$D = 2\pi r/n_1, \quad (1b)$$

where r is the radius of the rotor 12, and $n_1$ is the number of the poles $n_1$. Additionally, adjacent two of the permanent magnets 18 are spaced apart so that the following formula (2) holds:

$$0.3 < (L_q - L_d)/L_d, \quad (2)$$

It is preferable that the number of poles of the rotor 32 (denoted by $n_1$), and the number of slots 34, denoted by $n_2$ (that is, the number of the armature teeth 33) are any one of the following combinations:

$n_1=12, n_2=10,$
$n_1=14, n_2=10,$
$n_1=22, n_2=20,$
$n_1=18, n_2=20,$
$n_1=24, n_2=20,$
$n_1=26, n_2=20,$
$n_1=28, n_2=20,$
$n_1=26, n_2=30,$ and
$n_1=28, n_2=30.$ As is well known in the art, the five-phase IPM motor requires that the number of poles $n_1$ is an even number, and the number of slots $n_2$ is a multiple of 10, while the number of poles $n_1$ and the number of slots $n_2$ are different. Various combinations satisfying these requirements may be allowed for the number of poles $n_1$ and the number of slots $n_2$; however, the above-described combinations are, especially advantageous for the IPM motor 30, which is composed of the shallowly embedded permanent magnets 18.

Firstly, all these combinations require that the number of poles $n_1$ is relatively large. As described in the above-mentioned document, the increase in the number of poles $n_1$ increases the armature-coil-applied component of the flux generated by the field magnet system, and thereby increases the magnet torque, which is the main component of the output torque of the IPM motor 30.

Secondly, these combinations allow each permanent magnet 18, which functions as each pole of the field magnet system, to be opposed in the front of one of the armature teeth 33. This effectively increases the magnet torque, which is the main component of the output torque of the IPM motor 30. These combinations allow applying more of the flux generated by the permanent magnets 18 to the armature coils 35, and thereby increases the magnet torque.

Thirdly, these combinations increase the winding factor for the fundamental harmonic component of the stator magneto motive force, while allowing design for the reduction of the winding factor for the higher harmonic component. Therefore, these combinations especially increase the output of the IPM motor 30.

The above-described combinations, which enjoy all of these advantages, are advantageous for the IPM motor 30, in which the embedding depth of the permanent magnets 18 is shallow.

It should be noted that each permanent magnet 18, which functions as one pole of the field magnet system, may be composed of a plurality of permanent magnet pieces that generate magnetic flux in the same direction. In this case, bridge portions that couple the flux inducing portions 17a with the main core body 17b are provided between the permanent magnet pieces. The bridge portions improves the coupling strength between the flux inducing portions 17a and the main core body 17b, and thereby effectively improves the mechanical strength of the rotor 12.

The invention claimed is:

1. An interior permanent magnet electric rotating machine comprising:
   a stator; and
   a rotor including a rotor core and a plurality of permanent magnets functioning as a field magnet system,
   wherein said rotor has a side face opposed to said stator,
   wherein said permanent magnets each have a pole face opposed to said side face,
   wherein said permanent magnets are embedded so that a maximum value of a distance from said pole face to said side face satisfies the following formulas (1a) and (1b) which are represented by a radius r of said rotor $n_1$ and a number of poles of said field magnet system:

$$x \leq D/10, \text{ and} \qquad (1a)$$

$$D = 2\pi r/n_1, \text{ and} \qquad (1b)$$

wherein an adjacent two of said permanent magnets, which function as adjacent two poles of said field magnet system, are spaced apart so that the following formula (2) is satisfied, which is described using a q-axis inductance $L_q$, and d-axis inductance $L_d$:

$$0.3 < (L_q - L_d)/L_d \qquad (2).$$

2. The interior permanent magnet electric rotating machine according to claim 1, wherein said stator is fed with a three-phase current, and
   wherein said number of poles $n_1$ of said field magnet system and a number of slots $n_2$ provided for said stator are any one of the following combinations:
   $n_1=12, n_2=9,$
   $n_1=14, n_2=12,$
   $n_1=16, n_2=12,$
   $n_1=16, n_2=18,$
   $n_1=20, n_2=15,$
   $n_1=20, n_2=18,$
   $n_1=20, n_2=21,$
   $n_1=22, n_2=24,$
   $n_1=24, n_2=18,$
   $n_1=24, n_2=27,$
   $n_1=26, n_2=24,$
   $n_1=28, n_2=24,$ and
   $n_1=30, n_2=27.$ 3. The interior permanent magnet electric rotating machine according to claim 1, wherein said stator is fed with a five-phase current, and
   wherein said number of poles $n_1$ of said field magnet system and a number of slots $n_2$ provided for said stator are any one of the following combinations:
   $n_1=12, n_2=10,$
   $n_1=14, n_2=10,$
   $n_1=22, n_2=20,$
   $n_1=18, n_2=20,$
   $n_1=24, n_2=20,$
   $n_1=26, n_2=20,$
   $n_1=28, n_2=20,$
   $n_1=26, n_2=30,$ and
   $n_1=28, n_2=30.$

* * * * *